(12) United States Patent
Miyata

(10) Patent No.: US 6,569,215 B2
(45) Date of Patent: May 27, 2003

(54) COMPOSITION FOR POLISHING MAGNETIC DISK SUBSTRATE

(75) Inventor: Norihiko Miyata, Nagano (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/835,315

(22) Filed: Apr. 17, 2001

(65) Prior Publication Data

US 2001/0049913 A1 Dec. 13, 2001

Related U.S. Application Data

(60) Provisional application No. 60/240,977, filed on Oct. 18, 2000.

(30) Foreign Application Priority Data

Apr. 17, 2000 (JP) .......................................... 2000-115592

(51) Int. Cl.$^7$ .............................. C09C 1/68; C09G 1/02; C09G 1/04
(52) U.S. Cl. .............................. 51/307; 51/308; 51/309; 106/3; 438/692; 438/693; 216/89; 252/79.1; 252/79.2; 252/79.3; 252/79.4; 252/79.5
(58) Field of Search .......................... 51/307, 308, 309; 106/3; 438/692, 693; 216/89; 252/79.1, 79.2, 79.3, 79.4, 79.5

(56) References Cited

U.S. PATENT DOCUMENTS

| | | | | |
|---|---|---|---|---|
| 5,051,134 A | * | 9/1991 | Schnegg et al. ................. | 134/3 |
| 5,800,577 A | * | 9/1998 | Kido ............................... | 106/3 |
| 5,965,036 A | * | 10/1999 | Maki et al. ................... | 216/105 |
| 5,980,775 A | * | 11/1999 | Grumbine et al. ............. | 106/3 |
| 5,997,620 A | | 12/1999 | Kodama et al. | |

OTHER PUBLICATIONS

Patent Abstracts of Japan, Publication No. 11–167711, Jun. 22, 1999, Awaya Kurata, et al., "Production of Magnetic Disk Substrate".
Patent Abstracts of Japan, Publication No. 10–121035, May 12, 1998, Ishitobi Takeshi, et al., "Composition for Polishing Magnetic Disk Substrate".
Patent Abstracts of Japan, Publication No. 09–208934, Aug. 12, 1997, Ishitobi Takeshi, et al., "Composition for Polishing and Polishing of Magnetic Disk Substrate".
Patent Abstracts of Japan, abstracting JP 9204657 of Aug. 5, 1997.

* cited by examiner

Primary Examiner—Elizabeth D. Wood
(74) Attorney, Agent, or Firm—Sughrue Mion, PLLC

(57) ABSTRACT

An object of the present invention is to provide a composition for polishing a magnetic disk substrate that is used as a storage device for a computer or the like, and is capable of producing a magnetic disk substrate polished with high precision suitable for use in combination with a magnetic head that floats at a low level. Another object of the present invention is to provide a method of producing the composition for polishing the magnetic disk substrate. A polishing composition includes alkali metal ions, abrasive grains, a carboxylic acid, an oxidizing agent, and an anti-gelling agent contained in an aqueous medium. In a method of the present invention for preparing a polishing composition, a pH value of an aqueous medium, in which abrasive grains, a carboxylic acid, an oxidizing agent, and an anti-gelling agent are contained, is adjusted to a range of about 1 to about 5 by the addition of alkali metal hydroxide to the aqueous medium.

16 Claims, No Drawings

COMPOSITION FOR POLISHING MAGNETIC DISK SUBSTRATE

CROSS REFERENCE TO RELATED APPLICATIONS

This application is an application filed under 35 U.S.C. §111(a) claiming benefit pursuant to 35 U.S.C. §119(e)(1) of the filing date of Provisional Application No. 60/240,977 filed Oct. 18, 2000 pursuant to 35 U.S.C. §111(b).

FIELD OF THE INVENTION

The present invention relates to a polishing composition used in the manufacture of a magnetic disk substrate used as a storage device for a computer or the like. More particularly, the present invention relates to a composition for polishing a magnetic disk substrate that can provide a magnetic disk surface with high precision suitable for use in combination with a magnetic head that floats at a low level, and to a method of producing the above-mentioned polishing composition.

BACKGROUND OF THE INVENTION

Among the external storage devices for a computer or word processor, a magnetic disk (a memory hard disk) is widely used as a high-speed accessible means. One typical example of the magnetic disk is a disk obtained by subjecting an Al-alloy base material to electroless plating of NiP to form a substrate, polishing a surface of the substrate, and successively sputtering a Cr-alloy undercoat layer, a Co-alloy magnetic layer, and a carbon protective layer on the substrate in that order.

If a protrusion with a height that exceeds the floating level of the magnetic head remains on the magnetic disk surface, the magnetic head travels and collides with the protrusion while floating at a predetermined height. As a result, the protrusion will cause damage to the magnetic head. In addition, when a protrusion or a scratch caused by polishing exists on the magnetic disk substrate, the protrusion also appears on the Cr-alloy undercoat layer and the Co-alloy magnetic layer even when such layers are overlaid, and a flaw caused by the scratch is produced, whereby the magnetic disk is not provided with a smooth surface having high precision. Accordingly, it is necessary to precisely polish the substrate to enhance the precision of the disk surface.

For the polishing of the magnetic disk substrate, many polishing compositions are proposed that can remove the protrusion completely or buff the protrusion down to as low a height as possible without easily producing any scratches.

Japanese Laid-Open Patent Application No. 10-121035 discloses the use of a composition prepared by adding aluminum nitrate (serving as a polishing accelerator) to titania. In the aforementioned application, sub-micron particles of titanium oxide are used as abrasive grains. When such a composition is used for polishing the magnetic disk substrate, the surface precision can become higher and the polishing speed can be increased compared with when conventional compositions are used. However, in consideration of the hardness of the abrasive grain material, it is difficult to attain such a level of surface precision as is currently desired.

Japanese Laid-Open Patent Application No. 9-204657 discloses the use of a composition prepared by adding aluminum nitrate and an anti-gelling agent to colloidal silica. In Japanese Laid-Open Patent Application No. 9-204658 there is disclosed a use of a composition prepared by adding aluminum nitrate to fumed silica. Each of the compositions disclosed in the above-mentioned applications comprises finely-divided particles of silicon oxide with low hardness as the abrasive grains so that the surface precision can be easily obtained, although it is difficult to achieve a polishing speed suitable for real production.

Further, in Japanese Laid-Open Patent Application No. 10-204416, the use of many kinds of oxidizing agents and the use of Fe-salts are separately proposed to accelerate the polishing speed. However, the obtained polishing speed is still insufficient in light of real production in practice.

SUMMARY OF THE INVENTION

A composition for polishing an aluminum magnetic disk substrate that realizes high-density magnetic recording is required to provide a disk surface with high precision which enables a head to float at a low level.

Accordingly, an object of the present invention is to provide a composition for polishing a magnetic disk substrate capable of realizing high-density magnetic recording. The composition can provide a magnetic disk substrate having a low surface roughness with no protrusions or scratches caused by polishing, and can polish the magnetic disk substrate at a cost-effective speed.

The inventors of the present invention have intensively investigated an abrasive that can provide a polished surface with high precision required for an aluminum magnetic disk for use with a low floating magnetic head. As a result, the inventors have found a polishing composition that exhibits excellent properties in polishing an aluminum magnetic disk, especially, with a Ni-P plated aluminum magnetic disk. The present invention has been accomplished based on the above-mentioned finding.

Namely, the present invention basically provides the following aspects:

(1) A polishing composition comprising an aqueous medium together with alkali metal ions, abrasive grains, a carboxylic acid, an oxidizing agent, and an anti-gelling agent which are contained in said aqueous medium.

(2) The polishing composition as described in (1) above, wherein said alkali metal ions are contained in an amount of 0.001 to 5% by mass.

(3) The polishing composition as described in (1) or (2) above, wherein said alkali metal ions are supplied by alkali metal hydroxide.

(4) The polishing composition as described in (1) or (2) above, wherein said alkali metal ions comprise at least one ion selected from the group consisting of lithium, sodium, potassium, rubidium, and cesium ions.

(5) The polishing composition as described in (1) or (2) above, wherein said alkali metal ions are potassium ions.

(6) The polishing composition as described in (1) or (2) above, wherein said abrasive grains comprise at least one material selected from the group consisting of alumina, titania, silica, and zirconia.

(7) The polishing composition as described in (1) or (2) above, wherein said abrasive grains have a secondary particle with a mean particle diameter of 0.03 to 0.5 $\mu$m.

(8) The polishing composition as described in (1) or (2) above, wherein said abrasive grains are in the form of colloidal particles.

(9) The polishing composition as described in (1) or (2) above, wherein said carboxylic acid is an organic carboxylic acid comprising at least one COOH group or COO— group in a molecule thereof.

(10) The polishing composition as described in (1) or (2) above, wherein said carboxylic acid comprises at least one acid selected from the group consisting of gluconic acid, lactic acid, tartaric acid, glycolic acid, glyceric acid, malic acid, citric acid, formic acid, acetic acid, propionic acid, acrylic acid, oxalic acid, malonic acid, succinic acid, adipic acid, maleic acid, itaconic acid, glycine, lysine, aspartic acid, and glutamic acid.

(11) The polishing composition as described in (1) or (2) above, wherein said oxidizing agent comprises at least one material selected from the group consisting of a peroxide, a persulfate, a nitrate, an oxyacid salt, and an iron salt.

(12) The polishing composition as described in (1) or (2) above, wherein said oxidizing agent comprises a hydrogen peroxide.

(13) The polishing composition as described in (1) or (2) above, wherein said anti-gelling agent comprises at least one material selected from the group consisting of a phosphonic acid compound, phenanthroline, and aluminum acetylacetonate.

(14) The polishing composition as described in (1) or (2) above, wherein said anti-gelling agent comprises at least one material selected from the group consisting of phosphoric acid, 1-hydroxyethane-1,1-diphosphonic acid, aminotrimethylenephosphonic acid, phenanthroline, and aluminum acetylacetonate.

(15) The polishing composition as described in (1) or (2) above, wherein said composition has a pH value in a range of about 1 to about 5.

(16) The polishing composition as described in (1) or (2) above, wherein said composition comprises 3 to 30% by weight of abrasive grains, 0.1 to 8% by weight of a carboxylic acid, 0.2 to 5% by weight of an oxidizing agent, and 2% or less by weight of an anti-gelling agent.

(17) The polishing composition as described in (1) or (2) above, wherein said polishing composition is a composition for polishing a magnetic disk substrate.

(18) A method for preparing a polishing composition comprising the step of adding alkali metal hydroxide to an aqueous medium in which abrasive grains, a carboxylic acid, an oxidizing agent, and an anti-gelling agent are contained so as to adjust a pH value of said aqueous medium to a range of about 1 to about 5.

DESCRIPTION OF THE PREFERRED EMBODIMENTS

The polishing composition of the present invention is characterized in that alkali metal ions, abrasive grains, a carboxylic acid, an oxidizing agent, and an anti-gelling agent are contained in an aqueous medium. It is preferable that the alkali metal ions be contained in the composition in an amount of 0.001 to 5% by mass. In a method of preparing the polishing composition, alkali metal hydroxide is preferably used to provide the alkali metal ions. The present invention provides a production method for a polishing composition, characterized by comprising the step of adding alkali metal hydroxide to an aqueous medium in which abrasive grains, a carboxylic acid, an oxidizing agent, and an anti-gelling agent are contained. The alkali metal ions may be supplied not only from alkali metal hydroxide, but also from alkali metal carboxylate and an oxidizing agent including an alkali metal ion. The addition of alkali metal ions, in particular, the addition of potassium hydroxide can effectively prevent the occurrence of micro-scratches.

The above-mentioned effect can be recognized more noticeably when colloidal particles are used as the abrasive grains. Although the detailed mechanism for producing the above-mentioned effect has not been clarified, the addition of alkali metal ions, in particular, the addition of alkali metal hydroxide in a proper amount is believed to improve the dispersed condition of the polishing composition.

In the polishing composition of the present invention, the alkali metal ions may be contained in an amount of 0.001 to 5% by mass as mentioned above, preferably 0.01 to 3% by mass, and more preferably 0.05 to 1% by mass. When the amount of alkali metal ions to be added is less than 0.001% by mass, no effect is produced to prevent the occurrence of micro-scratches. An amount of 5% by mass or more will cause the problem of decreasing in the polishing speed.

The abrasive grains contained as an abrasive for use in the polishing composition of the present invention are not particularly limited. For example, alumina, titania, silica, zirconia, and the like can be employed, and the crystalline form thereof is not limited. For instance, alumina (i.e., aluminum oxide) has crystalline forms of $\alpha$, $\gamma$, $\delta$, $\eta$, $\theta$, $\kappa$, and $\chi$; titania (i.e., titanium oxide) has crystalline forms of rutile, anatase, and brookite; silica (i.e., silicon oxide) includes colloidal silica, fumed silica, and white carbon; and zirconia (i.e., zirconium oxide) has a monoclinic system, a tetragonal system, and an amorphous form. Any of these can preferably be used.

The secondary particles (the phrase "secondary particle" means "the flocculate, agglomerate or aggregate of particles (primary particles)" where the diameter of a primary particle is less than or equal to the diameter of a secondary particle) of the above-mentioned abrasive grains usually have a mean particle diameter of 0.03 to 0.5 $\mu$m, preferably in the range of 0.04 to 0.2 $\mu$m. In addition, abrasive grains in the form of colloidal particles are more preferable. A value measured by a controlled reference method of dynamic light scattering, using "Microtrac UPA150" (made by Honeywell, Inc.), is used as the mean particle diameter of secondary particles in the present invention.

With the increase of the secondary particle diameter of the abrasive grains, gelation and aggregation of fine particles can be prevented, while the probability of coarse particles existing increases, thereby causing scratches in the course of polishing. The decrease of the secondary particle diameter easily causes the above-mentioned gelation and aggregation, which will produce scratches during polishing. For example, when silicon oxide is used as the abrasive in the polishing composition of the present invention, it is preferable that the secondary particles have a mean particle diameter of 0.03 to 0.5 $\mu$m, and more preferably 0.04 to 0.2 $\mu$m.

The carboxylic acid contained in the polishing composition of the present invention is a conventionally known organic carboxylic acid having at least one functional group such as a —COOH group or a —COO$^-$ group in the molecule. For example, at least one kind of carboxylic acid may be freely selected from the group consisting of low molecular weight polycarboxylic acids such as gluconic acid, lactic acid, tartaric acid, glycolic acid, glyceric acid, malic acid, citric acid, formic acid, acetic acid, propionic acid, acrylic acid, oxalic acid, malonic acid, succinic acid, adipic acid, maleic acid, itaconic acid, glycine, lysine, aspartic acid, and glutamic acid; and other polycarboxylic acids such as polyacrylic acid and polymethacrylic acid. In the polishing composition of the present invention, the low molecular weight polycarboxylic acid is preferable, and, in particular, oxalic acid and malic acid are more preferable. The aforementioned —COO$^-$ group in a molecule of the carboxylic acid is derived from partial dissociation of the COOH group, or dissociation of a carboxylic acid alkali metal salt.

Although the effect of the carboxylic acid in the polishing composition has not yet been exactly clarified, the etchant effect of the acid in the polishing action is considered to be contributory. In addition, the low molecular weight polycarboxylic acid also has an effect of a chelating action.

In addition to the above-mentioned carboxylic acid, a straight-chain or branched organic sulfonic acid having 1 to 10 carbon atoms may also be contained in the polishing composition of the present invention. Examples of the sulfonic acid include methanesulfonic acid, ethanesulfonic acid, propanesulfonic acid, butanesulfonic acid, benzenesulfonic acid, and toluenesulfonic acid. The content of the organic sulfonic acid in the polishing composition is similar to that of the carboxylic acid.

It is preferable that the pH of the polishing composition of the present invention be in the range of about 1 to about 5, more preferably about 2 to about 4, and further preferably about 2 to about 3. In the pH value mentioned above, the term "about" includes a range of ±10%. When the liquid is made acidic, oxidation of Ni is accelerated to improve the polishing speed. However, when the pH value is too low, there is a problem of corrosion of the device. Therefore, a pH of 2 to 3 is further preferable. Alkali metal hydroxide can be used for pH adjustment.

When the abrasive grains are contained in the polishing composition in an amount of less than 3% by mass (hereinafter referred to as simply "%" unless otherwise noted), the polishing speed is significantly decreased. With an increase in concentration of the abrasive grains, the polishing speed is increased. However, when the concentration of the abrasive grains exceeds 30%, there is no increase in the polishing speed, and in addition, gelation of the abrasive grains, in particular when the abrasive grains are in the form of colloidal particles, readily takes place. In view of economical efficiency, an upper limit of the concentration is 30% for practical use. Accordingly, the concentration of the abrasive grains in the polishing composition is preferably in the range of 3 to 30%, and more preferably 5 to 15%.

The amount of carboxylic acid contained in the polishing composition of the present invention is preferably 0.1 to 8%, and more preferably 0.5 to 5%. When the amount of carboxylic acid is less than 0.1%, the effect of accelerating the polishing action is lowered. Even though the amount of carboxylic acid exceeds 5%, the effect of accelerating the polishing action does not increase.

It is preferable that the amount of oxidizing agent (for example, hydrogen peroxide) in the polishing composition of the present invention be 0.2 to 5%, and more preferably 0.5 to 3%. When the amount of hydrogen peroxide is less than 0.2%, the polishing accelerating effect is lowered. When the amount of hydrogen peroxide exceeds 5%, the effect of accelerating the polishing action does not increase.

As the anti-gelling agent for use in the present invention, at least one compound selected from the group consisting of a phosphonic acid compound, phenanthroline, and aluminum acetylacetonate is preferably employed. Specific examples of the phosphonic acid compound include phosphoric acid, 1-hydroxyethane-1,1-diphosphonic acid ($C_2H_6O_7P_2$) and aminotrimethylenephosphonic acid ($C_2H_{12}O_9P_3N$). 1,10-phenanthroline.1 hydrate ($C_{12}H_8N_2.H_2O$) and an aluminum complex salt of acetylacetone ($Al_2[CH(COCH_3)_3]$) are respectively given as examples of the phenanthroline compound and the aluminum acetylacetonate. It is preferable that the anti-gelling agent be contained in the polishing composition in an amount of 2% or less.

The above-mentioned amounts of the respective components are defined for polishing the magnetic disk substrate. When the polishing composition is transported after being produced, it is advantageous to prepare a composition with concentrations of the above-mentioned components higher than those mentioned above, and to dilute the composition to obtain the previously specified concentrations when the composition is used.

The composition for polishing the magnetic disk substrate according to the present invention may further comprise a surfactant and an antiseptic in addition to the above-mentioned components. In this case, however, it is necessary to pay close attention to the kinds and amounts of the surfactant and the antiseptic so as not to induce gelation in the composition.

The polishing composition of the present invention can be prepared by suspending the abrasive grains in water and adding a carboxylic acid such as oxalic acid, hydrogen peroxide, and an anti-gelling agent to the suspension in a manner similar to that used in the preparation of conventional polishing compositions, and by adjusting the pH value with alkali metal hydroxide. All the components may be mixed and diluted for use. Alternatively, there is a method of preliminarily dividing the components into two groups. For example, one group including water, abrasive grains, carboxylic acid, and alkali metal hydroxide, and another group including water, hydrogen peroxide, and the anti-gelling agent, and thereafter mixing the two groups together.

The polishing composition of the present invention is advantageously applicable to a substrate of a magnetic disk with a high recording density (generally, with a recording density of 3 Gbits/inch$^2$ or more), as represented by a magnetic disk for a magnetic head utilizing a magnetoresistance (MR) effect. Also, the application to a magnetic disk having less recording density is very effective from the viewpoint of improvement in reliability.

A magnetic hard disk substrate to which the polishing composition of the present invention is applicable is not particularly limited. When the polishing composition is used for an aluminum substrate (including an aluminum alloy substrate), in particular, for a Ni-P plated aluminum substrate by electroless plating, a polished surface with high quality can be advantageously obtained from an industrial viewpoint.

A polishing method comprises the steps of causing a polishing pad commonly used for a slurry-like abrasive to press against the magnetic disk substrate, and rotating the pad or the substrate while supplying the slurry to a gap between the pad and the substrate.

When the magnetic disk is made of a substrate that is polished using the polishing composition of the present invention, occurrence of fine defects such as micro-pits and micro-scratches is extremely low. In addition, the surface of the magnetic disk has excellent surface smoothness, in terms of the surface roughness (Ra) of about 2 to about 3 Å.

EXAMPLES

The present invention will now be explained in more detail with reference to the following examples, but the present invention is not limited to these examples. Unless indicated otherwise herein, all parts, percents, ratios and the like are by weight.

TABLE 1 shows the kinds of abrasives and the properties thereof used in the respective Examples and Comparative Examples.

TABLE 1

| Abrasive Grain (Name in short used in TABLE 2) | Trademark | Secondary Particle Diameter (μm) |
|---|---|---|
| Silicon oxide (1) (Silica (1)) | Syton HT-50 | 0.05 |
| Silicon oxide (2) (Silica (2)) | E-150J | 0.1 |
| Silicon oxide (3) (Silica (3)) | AEROSIL 50 | 0.1 |
| Titanium oxide (1) (Titania (1)) | F-2 | 0.3 |
| Titanium oxide (2) (Titania (2)) | F-4 | 0.2 |
| Alumina | | 0.2 |
| Zirconia | | 0.2 |

Examples 1 to 14 and 20 to 22

Water, a carboxylic acid, an oxidizing agent, an anti-gelling agent, and alkali metal hydroxide were added to colloidal silica "Syton HT-50F" (trademark), made by Du Pont Kabushiki Kaisha in the ratios shown in TABLE 2 to prepare a variety of aqueous polishing compositions. Polishing was performed under polishing conditions using a polishing machine as described below. The results are shown in TABLE 2.

The particle diameter was measured by a controlled reference method of dynamic light scattering, using "Microtrac UPA150" (trademark) made by Honeywell, Inc. The measured values of particle size are shown in TABLE 1. The pH values of the compositions were measured using a hydrogen ion concentration meter with glass electrodes "D-13" manufactured by HORIBA, Ltd.

Examples 15 and 16

A mixture of white carbon "E-150J" (trademark) made by Nippon Silica Industrial Co., Ltd. and fumed silica "AEROSIL-50" (trademark) made by Nippon Aerosil Co., Ltd. was ground in a media agitating mill, and coarse particles were removed by classification, whereby silicon oxide having secondary particles with a mean particle diameter of 0.1 μm was obtained. Then, water, a carboxylic acid, an oxidizing agent, an anti-gelling agent, and alkali metal hydroxide were added to the silicon oxide particles in the respective ratios shown in TABLE 2 to prepare a variety of aqueous polishing compositions. Polishing was performed under polishing conditions using a polishing machine as described below. The results are shown in TABLE 2.

Example 17 to 19

Titanium oxide "Supertitania F-4" (trademark) made by Showa Titanium Co., Ltd., alumina and zirconia was ground in a media agitating mill, and coarse particles were removed by classification, whereby titanium oxide having secondary particles with a mean particle diameter of 0.2 μm was obtained. Then, water, a carboxylic acid, an oxidizing agent, an anti-gelling agent, and alkali metal hydroxide were added to the titanium oxide particles in the respective ratios shown in TABLE 2 to prepare an aqueous polishing composition. Polishing was performed under polishing conditions using a polishing machine as described below. The results are shown in TABLE 2.

Polishing Conditions

As a substrate, a 3.5-inch aluminum disk plated with NiP by electroless plating was employed.

| Polishing machine and polishing conditions: | |
|---|---|
| Polishing machine | 4-way double-sided polishing machine |
| Polishing pad | Suede type (trademark "Polytex DG" made by Rodel, Inc. |
| Number of revolution of lower surface plate | 60 rpm |
| Slurry feeding speed | 50 ml/min |
| Polishing time | 5 min |
| Working pressure | 50 g/cm$^2$ |

Evaluation of Polishing Properties

Polishing rate: calculated in terms of a decrease in weight of the aluminum disk after polishing Surface roughness: measured using "Talystep" and "Talydata 2000" (trademarks), made by Rank Taylor Hobson Co.

A depth of a scratch caused by polishing was obtained by analyzing the shape of the scratch using a probe-type surface analyzer "P-12" made by TENCOR Corporation in a three dimensional mode.

The evaluation results of the polishing properties are shown in TABLE 2. In TABLE 2, a scratch A caused by polishing has a depth of 2 nm or less, and a scratch B caused by polishing has a depth of 2 to 10 nm. No scratches with a depth of 10 nm or more were caused in the Examples or in the Comparative Examples.

Comparative Examples 1 and 2

Water, aluminum nitrate, and hydrogen peroxide were added to colloidal silica "Syton HT-50F" (trademark), made by Du Pont Kabushiki Kaisha in the ratios shown in TABLE 2 to prepare aqueous polishing compositions. Polishing was performed in the same manner as in the Examples. The results are shown in TABLE 2.

Comparative Example 3

Titanium oxide "Supertitania F-2" (trademark), made by Showa Titanium Co., Ltd. was ground by a media agitating mill, and coarse particles were removed by classification, whereby titanium oxide having secondary particles with a mean particle diameter of 0.3 μm was obtained. Then, water and aluminum nitrate were added to the titanium oxide particles in the respective ratios shown in TABLE 2 to prepare an aqueous polishing composition. Polishing was performed in the same manner as in the Examples. The results are shown in TABLE 2.

Comparative Example 4

Titanium oxide "Supertitania F-4" (trademark), made by Showa Titanium Co., Ltd. was ground in a media agitating mill, and coarse particles were removed by classification, whereby titanium oxide having secondary particles with a mean particle diameter of 0.2 μm was obtained. Then, water and aluminum nitrate were added to the titanium oxide particles in the respective ratios shown in TABLE 2 to prepare an aqueous polishing composition. Polishing was performed in the same manner as in the Examples. The results are shown in TABLE 2.

TABLE 2

| | Abrasive Grains (Abrasive) (% by mass) | | Carboxylic acid (% by mass) | | Oxidizing agent (% by mass) | | Anti-gelling Agent (% by mass) | | Alkali metal ion (% by mass) | | | Polishing rate ($\mu$m/min) | Surface Roughness (Ra) (nm) | Scratch Caused by Polishing | Pit |
|---|---|---|---|---|---|---|---|---|---|---|---|---|---|---|---|
| | Type | Amount | Type | Amount | Type | Amount | Type | Amount | Type | Amount | pH | | | | |
| Ex. 1 | Silica (1) | 5 | Oxalic acid | 1.0 | H$_2$O$_2$ | 1.0 | HEDP | 0.2 | K | 0.6 | 3 | 0.18 | 0.2 | A | A |
| Ex. 2 | Silica (1) | 10 | Oxalic acid | 1.0 | H$_2$O$_2$ | 1.0 | HEDP | 0.2 | K | 0.5 | 3 | 0.20 | 0.2 | A | A |
| Ex. 3 | Silica (1) | 15 | Oxalic acid | 1.0 | H$_2$O$_2$ | 1.0 | HEDP | 0.2 | K | 0.4 | 3 | 0.22 | 0.2 | A | A |
| Ex. 4 | Silica (1) | 10 | Oxalic acid | 0.5 | H$_2$O$_2$ | 1.0 | HEDP | 0.2 | K | 0.2 | 3 | 0.19 | 0.2 | A | A |
| Ex. 5 | Silica (1) | 10 | Oxalic acid | 4.0 | H$_2$O$_2$ | 1.0 | HEDP | 0.2 | K | 1.7 | 3 | 0.21 | 0.2 | A | A |
| Ex. 6 | Silica (1) | 10 | Oxalic acid | 1.0 | H$_2$O$_2$ | 0.5 | HEDP | 0.2 | K | 0.5 | 3 | 0.18 | 0.2 | A | A |
| Ex. 7 | Silica (1) | 10 | Oxalic acid | 1.0 | H$_2$O$_2$ | 3.0 | HEDP | 0.2 | K | 0.5 | 3 | 0.22 | 0.2 | A | A |
| Ex. 8 | Silica (1) | 10 | Oxalic acid | 1.0 | H$_2$O$_2$ | 1.0 | HEDP | 0.2 | K | 0.2 | 2 | 0.22 | 0.2 | A | A |
| Ex. 9 | Silica (1) | 10 | Oxalic acid | 1.0 | H$_2$O$_2$ | 1.0 | HEDP | 0.2 | K | 0.7 | 5 | 0.18 | 0.2 | A | A |
| Ex. 10 | Silica (1) | 10 | Malic acid | 1.5 | H$_2$O$_2$ | 1.0 | HEDP | 0.2 | K | 0.2 | 3 | 0.18 | 0.2 | A | A |
| Ex. 11 | Silica (1) | 10 | Succinic acid | 1.2 | H$_2$O$_2$ | 1.0 | HEDP | 0.2 | K | 0.2 | 3 | 0.18 | 0.2 | A | A |
| Ex. 12 | Silica (1) | 10 | Oxalic acid | 1.0 | H$_2$O$_2$ | 1.0 | MP | 0.2 | K | 0.5 | 3 | 0.20 | 0.2 | A | A |
| Ex. 13 | Silica (1) | 10 | Oxalic acid | 1.0 | H$_2$O$_2$ | 1.0 | P | 0.2 | K | 0.3 | 3 | 0.20 | 0.2 | A | A |
| Ex. 14 | Silica (1) | 10 | Oxalic acid | 1.0 | H$_2$O$_2$ | 1.0 | AA | 0.2 | K | 0.3 | 3 | 0.20 | 0.2 | A | A |
| Ex. 15 | Silica (2) | 10 | Oxalic acid | 1.0 | H$_2$O$_2$ | 1.0 | HEDP | 0.2 | K | 0.3 | 3 | 0.20 | 0.2 | A | A |
| Ex. 16 | Silica (3) | 10 | Oxalic acid | 1.0 | H$_2$O$_2$ | 1.0 | HEDP | 0.2 | K | 0.3 | 3 | 0.20 | 0.2 | A | A |
| Ex. 17 | Titania (2) | 6 | Oxalic acid | 1.0 | H$_2$O$_2$ | 1.0 | HEDP | 0.2 | K | 0.2 | 3 | 0.21 | 0.3 | A | A |
| Ex. 18 | Alumina | 15 | Oxalic acid | 1.0 | H$_2$O$_2$ | 1.0 | HEDP | 0.2 | K | 0.4 | 3 | 0.21 | 0.3 | A | A |
| Ex. 19 | Zirconia | 15 | Oxalic acid | 1.0 | H$_2$O$_2$ | 1.0 | HEDP | 0.2 | K | 0.4 | 3 | 0.21 | 0.3 | A | A |
| Ex. 20 | Silica (1) | 15 | Oxalic acid | 1.0 | H$_2$O$_2$ | 1.0 | HEDP | 0.2 | Li | 0.4 | 3 | 0.22 | 0.2 | A | A |
| Ex. 21 | Silica (1) | 15 | Oxalic acid | 1.0 | H$_2$O$_2$ | 1.0 | HEDP | 0.2 | Na | 0.4 | 3 | 0.22 | 0.2 | A | A |
| Ex. 22 | Silica (1) | 15 | Oxalic acid | 1.0 | H$_2$O$_2$ | 1.0 | HEDP | 0.2 | Rb | 0.4 | 3 | 0.22 | 0.2 | A | A |
| Comp. Ex. 1 | Silica (1) | 10 | Al nitrate | 5.0 | H$_2$O$_2$ | 1.0 | — | | — | | 2 | 0.08 | 0.4 | B | A |
| Comp. Ex. 2 | Silica (1) | 10 | — | | H$_2$O$_2$ | 1.0 | HEDP | 0.2 | — | | 2 | 0.09 | 0.2 | A | A |
| Comp. Ex. 3 | Titania (1) | 6 | Al nitrate | 5.0 | — | | — | | — | | 3 | 0.21 | 0.4 | B | B |
| Comp. Ex. 4 | Titania (2) | 6 | Al nitrate | 5.0 | — | | — | | — | | 3 | 0.21 | 0.3 | B | B |

HEDP: 1-hydroxyethane-1,1-diphosphonic acid
P: 1,10-phenanthroline
MP: methylenephosphonic acid
AA: aluminum acetylacetonate When a disk is polished using a polishing composition of the present invention, the disk can be quickly polished so that the surface roughness becomes remarkably low. A magnetic disk made of the polished disk is useful as a hard disk of low-floating type capable of high-density recording.

In particular, the magnetic disk made of the polished disk is advantageously utilized as a high recording density medium (having a recording density of 3 Gbits/inch$^2$ or more), as represented by a medium for MR head utilizing a magnetoresistance (MR) effect. Also, a medium having less recording density is very usable because the medium can be provided with high reliability.

While the invention has been described in detail and with reference to specific embodiments thereof, it will be apparent to one skilled in the art that various changes and modifications can be made therein without departing from the spirit and scope thereof.

What is claimed is:

1. A polishing composition comprising an aqueous medium comprising alkali metal ions, abrasive grains, a carboxylic acid, an oxidizing agent, and an anti-gelling agent, and having a pH of about 1 to about 4.

2. The polishing composition as claimed in claim 1, wherein said alkali metal ions are contained in an amount of 0.001 to 5% by mass.

3. The polishing composition as claimed in claim 1 or 2, wherein said alkali metal ions are supplied by an alkali metal hydroxide.

4. The polishing composition as claimed in claim 1 or 2, wherein said alkali metal ions comprise at least one ion selected from the group consisting of lithium, sodium, potassium, rubidium, and cesium ions.

5. The polishing composition as claimed in claim 1 or 2, wherein said alkali metal ions are potassium ions.

6. The polishing composition as claimed in claim 1 or 2, wherein said abrasive grains comprise at least one material selected from the group consisting of alumina, titania, silica, and zirconia.

7. The polishing composition as claimed in claim 1 or 2, wherein said abrasive grains have a secondary particle with a mean particle diameter of 0.03 to 0.5 $\mu$m.

8. The polishing composition as claimed in claim 1 or 2, wherein said abrasive grains are in the form of colloidal particles.

9. The polishing composition as claimed in claim 1 or 2, wherein said carboxylic acid is an organic carboxylic acid comprising at least one COOH group or COO— group in a molecule thereof.

10. The polishing composition as claimed in claim 1 or 2, wherein said carboxylic acid comprises at least one acid selected from the group consisting of gluconic acid, lactic acid, tartaric acid, glycolic acid, glyceric acid, malic acid, citric acid, formic acid, acetic acid, propionic acid, acrylic acid, oxalic acid, malonic acid, succinic acid, adipic acid, maleic acid, itaconic acid, glycine, lysine, aspartic acid, and glutamic acid.

11. The polishing composition as claimed in claim 1 or 2, wherein said oxidizing agent comprises at least one material selected from the group consisting of a peroxide, a persulfate, a nitrate, an oxyacid salt, and an iron salt.

12. The polishing composition as claimed in claim 1 or 2, wherein said oxidizing agent comprises a hydrogen peroxide.

13. The polishing composition as claimed in claim 1 or 2, wherein said anti-gelling agent comprises at least one material selected from the group consisting of a phosphonic acid compound, phenanthroline, and aluminum acetylacetonate.

14. The polishing composition as claimed in claim 1 or 2, wherein said anti-gelling agent comprises at least one material selected from the group consisting of phosphoric acid, 1-hydroxyethane-1,1-diphosphonic acid, aminotrimethylenephosphonic acid, phenanthroline, and aluminum acetylacetonate.

15. The polishing composition as claimed in claim 1 or 2, wherein said composition comprises 3 to 30% by weight of abrasive grains, 0.1 to 8% by weight of a carboxylic acid, 0.2 to 5% by weight of an oxidizing agent, and 2% or less by weight of an anti-gelling agent.

16. A method for preparing a polishing composition comprising the step of adding alkali metal hydroxide to an aqueous medium comprising abrasive grains, a carboxylic acid, an oxidizing agent, and an anti-gelling agent to adjust a pH value of said aqueous medium to a range of about 1 to about 4.

* * * * *